F. H. DUNHAM.
APPARATUS FOR AND METHOD OF TREATING ASPHALT SOLUTIONS FOR THE PRODUCTION OF ASPHALT CEMENT AND THE RECOVERY OF THE LIGHTER PRODUCTS.
APPLICATION FILED FEB. 18, 1908.
1,003,040.
Patented Sept. 12, 1911.
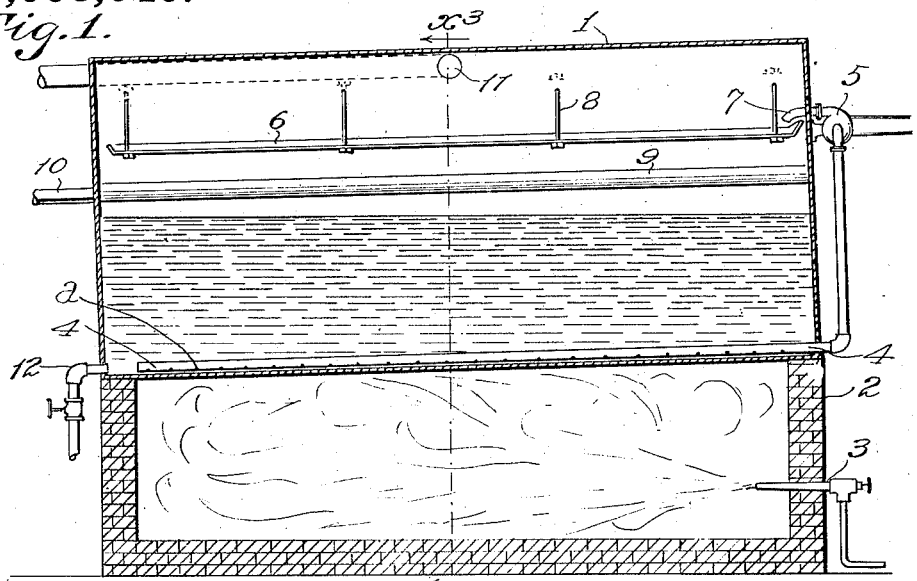
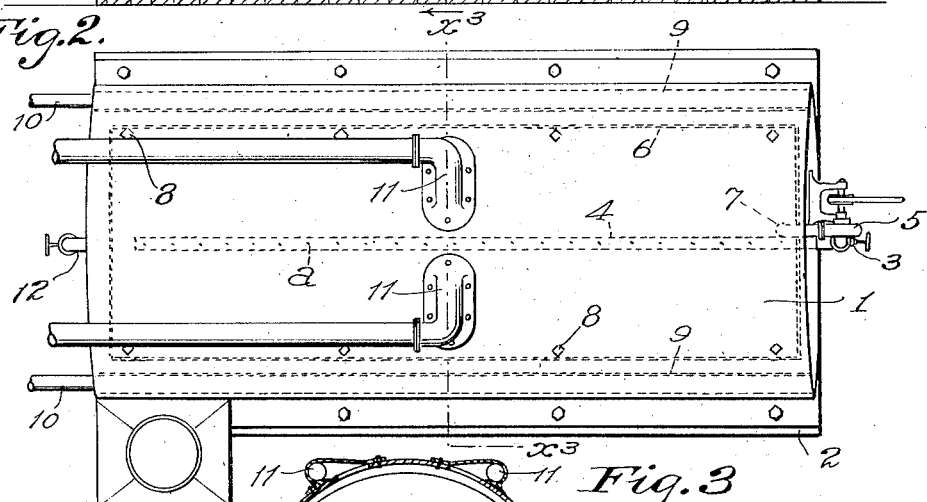
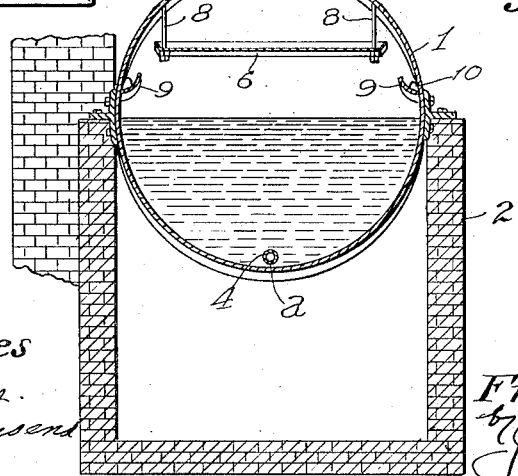
Witnesses
C. C. Holly
Julia Townsend
Inventor
Franklin H. Dunham
by James R. Townsend
his atty

UNITED STATES PATENT OFFICE.

FRANKLIN H. DUNHAM, OF LOS ANGELES, CALIFORNIA.

APPARATUS FOR AND METHOD OF TREATING ASPHALT SOLUTIONS FOR THE PRODUCTION OF ASPHALT CEMENT AND THE RECOVERY OF THE LIGHTER PRODUCTS.

1,003,040. Specification of Letters Patent. Patented Sept. 12, 1911.

Application filed February 18, 1908. Serial No. 416,611.

*To all whom it may concern:*

Be it known that I, FRANKLIN H. DUNHAM, a citizen of the United States, residing at Los Angeles, in the county of Los Angeles and State of California, have invented a new and useful Apparatus for and Method of Treating Asphalt Solutions for the Production of Asphalt Cement and the Recovery of the Lighter Products, of which the following is a specification.

This invention relates to the treatment of certain crude hydrocarbon oils found in Southern California, Texas, Louisiana and elsewhere and commonly known as oils having an asphaltic base. My investigations show that these oils are asphalt solutions and that the asphalt therein is held in suspension by lighter hydrocarbon oils, which act as solvents of the asphaltum. There is usually also found in these oils a proportion of sulfur in chemical combination with the heavier hydrocarbons. I have discovered that by proper treatment of said crude hydrocarbon oils, the lighter constituents can be removed without affecting the structure of the asphalt and that when so removed a practically pure asphalt cement may be obtained.

The object of the invention is to obtain from asphalt solutions, such as asphaltic hydrocarbon oils more valuable products than can be obtained therefrom by methods heretofore in vogue.

The principle of this invention consists in extracting the solvents from the solution at lower temperature than heretofore deemed necessary in the production of such cement.

It is characteristic of my invention that I produce an asphalt cement superior in quantity and quality and at a low temperature (equivalent to economy of time, labor and fuel) and without the admixture, at any stage of the process, of any extraneous substance, solution or vapor.

I depart from the ordinary method and from the ordinary apparatus in various particulars which will be more fully exemplified and set forth in the subjoined detailed specification.

I have discovered that by providing an extractor devoid of the customary dome and from which there are no vapor outlets that extend materially above the level of the main body of the extractor, and arranging a pan in the chamber of the extractor between the levels of upper and lower vapor outlets, and charging the pan with hot asphalt solution, that a tendency heretofore existing to carry off vapors that might condense within the extractor chamber is in a measure done away with and that by keeping the temperature comparatively low, much of the condensation of the hydrocarbon vapors that has heretofore been accomplished only outside of the extractor shell, can be caused to occur inside the extractor, so that by collecting and carrying off the same, and by collecting and condensing the vapors that find their way to the top of the main body of the extractor, without any extra aid as by an elevated pipe or dome a maximum amount of hard cement can be obtained in a minimum amount of time without loss of the hydrocarbon vapors.

The accompanying drawings illustrate my newly-invented apparatus which is adapted for carrying on my newly-discovered process.

Figure 1 is a longitudinal vertical section of apparatus embodying my improved means adapted for carrying on my newly-discovered method. Fig. 2 is a plan of said apparatus. Fig. 3 is a fragmental cross-section of the same on line $x^3$, Figs. 1 and 2, looking to the left.

1 designates the extractor in the form of a cylindrical shell which may be of any suitable dimensions, as for instance, ten feet in diameter and twenty-two feet in length; the same being set in a furnace-wall, 2, of ordinary construction and provided with means as the fluid fuel burner 3 for supplying heat to the lower half of the shell.

The shell 1 may have a slant or slope from front to rear end sufficient for drainage; for instance, a slope of six inches in 22 feet.

The shell is designed to contain a suitable charge, viz., 100 barrels, more or less, of the asphaltic oil to be treated and the material in such charge will be kept fluid by the heat as the lighter oils are eliminated and the asphalt cement produced.

4 designates a perforated suction-pipe having orifices $a$ at its under side to receive the fluid material at the bottom of the extractor.

5 designates a pump connected with the higher end of the pipe 4 to draw liquid through such pipe from the bottom of the extractor and to discharge it into an evaporating pan 6 located in the extractor, preferably about midway between the horizontal axial plane of the extractor and the top of the extractor.

7 is a pipe leading from the pump to discharge into the evaporating pan 6 so that said pan is constantly supplied with liquid from the bottom of the extractor. Said liquid will vary in its constituents from the crude oil at the beginning of the operation to a more and more nearly pure asphalt cement maintained in fluid condition by the heat from the burner 3. Said pan may be supported from the shell of the extractor by any suitable form of support, as rods or bolts 8, and may be of any suitable dimensions, as for instance, three inches deep and nearly coextensive with the horizontal, sectional plane of the cavity of the extractor at the level therein at which the pan is stationed.

9 designates troughs arranged along the median portion of the shell of the extractor for the purpose of collecting the heavier vapors, and conducting them out of the extractor together with the lighter oils which may collect on and flow as condensate down the sides of the shell, and conveying such vapors and condensate to pipes 10 by which they are drained off to any suitable receptacle, not shown, provided to retain them.
Said troughs 9 may be constructed parallel with the axis of the cylindrical extractor or shell 1, and consequently will slope to the rear in the same degree as the shell.

11 designates outlets for the lighter vapors distilled from the oil supplied to the extractor. These outlets may be of any desired size and number and lead to any form of receptacle, not shown, adapted for the recovery and retention or storage of the vapors in their vaporous or condensed form.

12 designates a valved draw-off for the hot asphalt cement.

An important feature in the construction of this extractor is the location of the outlets for the removal of the vapors, care being taken that said outlets are below and do not extend above the level of the top of the cylinder or main body which forms the extractor; the purpose of this being to remove the lighter vapors from the extractor at a comparatively low level and as soon as practicable after they have evolved from the liquid, so that they will not pile up inside the extractor to compress the vapors below and cause the same to precipitate and return to the charge of hydrocarbon.

The vaporized liquids that are capable of condensing within the chamber of the extractor above the level of the hot oil from which the vapors have been evolved will condense upon the inside surface of the extractor and such condensed liquids will flow in the form of oil downward along its sides to the troughs by which they are conducted out of the extractor through the outlets 11. Heavy vapors evolved from the charge in the pan will flow down over the edges of the pan and will mingle with the vapors rising from the main charge and will flow outwardly into the troughs along the side of the shell and thence out of the shell.

I have discovered that in the present processes of reducing asphaltic oils in which the temperatures employed at atmospheric pressure range from 650 to 750 degrees Fahrenheit, the effect of such heat is to cause a destructive distillation of a portion of the asphalt, and that such portion is driven off in the form of vapor to condense as an oil which proves to be no better than, and which commands no better price than crude oil, thus involving considerable loss. Such product heretofore has been found to be very deficient in heating power, and to contain fewer British thermal units than the crude oil from which it was produced. I have discovered that the distillation can be carried on at a sufficiently low temperature to avoid said destructive distillation and the consequent loss of asphalt, and that the pressure under which the distillation and separation take place should be but little if any above atmospheric pressure in order to secure the best results.

The evaporating pan has a solid bottom and the asphalt solution must cover the same from end to end to facilitate evaporation. The hot asphalt therein prevents condensation and dropping back of vapors from the charge below.

I have discovered that by the apparatus above described, and by distilling at atmospheric pressure and at a comparatively low temperature, as for instance, a temperature of 400 to 600 degrees Fahrenheit, provision is made for producing a superior asphalt cement without destructive distillation of the oil. That is to say, with the old process a portion of the asphalt was transmuted into oil, and together with more or less sulfur passed into the oil products to their injury, and to the detriment and impoverishment of the asphalt cement, and at the same time a destructive distillation of the oil was effected, all of which is avoided by this new treatment. Such former destructive distillation released sulfur vapors and free hydrogen which afterward unite in the condensed vapors to form sulfuretted hydrogen in the resultant oil.

One of the products under the old method was a sulfureted hydrogen gas which indicated a loss by destructive distillation. Such gas carried away from the products a good proportion of the hydrocarbons of the oil.

Furthermore, a carbonaceous deposit insoluble in carbon-tetrachlorid was left in the asphalt.

By my newly-invented process the production of sulfureted hydrogen is avoided, and the vapors, which issue through the outlets intended for emission of vapors from the newly-invented extractor, are hydrocarbon vapors which, when condensed, form hydrocarbon oils; so that the products of this new method of distillation consist of a vulcanized asphalt cement and pure hydrocarbon oils separated from each other with a minimum loss through non-condensable vapors.

The saving by this new method amounts to approximately four per cent., more or less, over the former methods. That is to say, with former methods there was a loss of approximately six per cent., more or less, of the values, and I avoid about 70 per cent. of such loss. Furthermore, the asphalt produced by this method is superior to the asphalts produced by former methods because it is free from any products of destructive distillation.

By my invention and discovery I am enabled to obtain from a given oil 65 parts asphaltum as compared with 40 parts asphaltum that would have been produced by the old method and apparatus; while I am also at the same time enabled to produce an oil of greater commercial value and well-adapted for fuel and lubricating purposes.

It is customary in some instances in the art as heretofore practiced, to use sulfuric acid for the purpose of bleaching and clarifying the lighter oils produced by distillation from crude asphaltic oils. In such treatment the sulfuric acid is introduced at the top of a receptacle filled with oil and commonly termed an agitator, and into the bottom of which a blast of compressed air is introduced; so that the sulfuric acid descending through the mass by the force of gravity will come into intimate relation with all the contents of the receptacle. After the contents of the receptacle have been thoroughly mixed with the sulfuric acid the mass is allowed to stand at rest until the sulfuric acid and the elements that have combined therewith settle to the bottom and are drawn off. The product thus drawn off is termed sludge.

The oils from former processes when treated with sulfuric acid show a strong reaction which is not apparent with the oil produced by my new process. With the old process a comparatively large amount of sludge is produced by the acid treatment, while with the oils produced by my present process the acid treatment produces only a small amount of sludge, thus showing that there is only a very small proportion of inferior oils.

In practice a charge of crude oil sufficient to fill the extractor about half full will be put into the extractor and brought to the required temperature of about and somewhat above 400 degrees Fahrenheit and will be maintained at about that temperature until the products have been made and drawn from the extractor. Then another charge of crude oil will be supplied and reduced as before, and so on.

After the oil has been brought to the required temperature the pump will be started into operation thereby drawing the hot oil from the bottom of the extractor and pouring it into the evaporating pan, whence it may overflow to the top of the charge thus continually bringing the hottest oil up into the space above the charge of oil.

At the outset of the process a considerable outflow of vapors will issue from the vapor-pipes 11 and no products will flow from the pipes 10; but as the process continues, products begin to flow from the oil-pipes 10 and the outflow of such products increases while the outflow of products from the upper pipes 11 gradually decreases. Furthermore, the gravity of the product from the lower pipes 10 gradually increases as the process continues, until the oil is all expelled from the charge and only asphalt remains in the extractor, which may then be emptied by drawing off the hot asphalt through the pipe 4. It is thus seen that the purpose of the outlets 11 is simply to remove the lighter vapors which might produce pressure inside the shell, but it is understood that while the apparatus is more effective with the outlets 11 arranged as shown approximately at and below the level of the top of the shell, the production of the asphaltic cement may be effected without withdrawing lighter vapors from the top of the shell, and that the outlets 10 may be depended upon entirely to remove the vapors without departing from the broad spirit of this invention.

By providing a shell of cylindrical form the outlets 11 are readily arranged in the most effective manner so that they can carry off all of the vapors which are able to arise to the top of the shell without carrying off the vapors which lie below the level of the outlet. A distinction is to be observed between the operation thus effected and that which would occur if a pipe or a dome were to open upward from the shell for the purpose of discharging the lighter vapors, in that in the form shown in the drawings the vapors at the top of the shell flow off practically by their own gravity without piling up and increasing the pressure in the manner which occurs when a dome or a gooseneck elevated above the shell is employed.

The principle of this invention is to eliminate the oils by condensing the vapors and carrying them off at minimum pressure and without forcing the still so that there is no danger of destructive distillation or cracking of the asphalt.

I claim:—

1. The method of obtaining asphalt from asphaltic oils which consists in heating the oil to a temperature between 400 and 600 degrees Fahrenheit within a shell, removing oil from the lower portion of the shell to the upper portion of the shell and there subjecting the same to the temperature of the shell above the surface of the lower charge of oil, and removing the heavier vapors and condensate from the shell below the level of the top of the upper charge thereof.

2. In an apparatus for obtaining asphalt-cement from asphalt solutions, the combination with a shell, means to heat the shell, means for carrying off light vapors from the upper portion of the shell, and means near the median portion of the shell to carry off heavy vapors and condensation from the walls of the shell, of an evaporating-pan in the shell above the last-named means, and means for transferring liquid from the lower part of the shell to said evaporating-pan.

3. An extractor for obtaining asphalt comprising a shell, an evaporating-pan in the upper portion of the shell, means for transferring liquid from the lower portion of the shell to said evaporating-pan, and means for collecting and discharging the products of condensation from the walls of the shell.

4. Apparatus for obtaining asphalt-cement from asphalt solutions, comprising an approximately horizontal cylindrical shell, means to heat the shell, means for carrying off uncondensed vapors from the upper portion of the shell, means near the median portion of the shell to carry off heavy vapors and products of condensation from the walls of the shell, an evaporating-pan in the shell above the last-named means, and means for transferring liquid from the lower part of the shell to said evaporating-pan.

5. The method of obtaining asphalt from asphaltic oils, which consists in heating the oil to a temperature between 400 and 600 degrees Fahrenheit within a shell, removing oil from the lower portion of the shell to the upper portion and there maintaining a charge of such removed oil, subjecting such charge to the temperature of the shell above the surface of the lower charge of oil, causing a flow of oil from the upper to the lower charge, and removing from below the top of the shell the products arising from said charges.

In testimony whereof, I have hereunto set my hand at Los Angeles, California, this 10th day of February, 1908.

FRANKLIN H. DUNHAM.

In presence of—
 JAMES R. TOWNSEND,
 JULIA TOWNSEND.